United States Patent

Wu et al.

[19]

[11] Patent Number: 6,029,221
[45] Date of Patent: Feb. 22, 2000

[54] SYSTEM AND METHOD FOR INTERFACING A DIGITAL SIGNAL PROCESSOR (DSP) TO AN AUDIO BUS CONTAINING FRAMES WITH SYNCHRONIZATION DATA

[75] Inventors: Yung Jung Wayne Wu, Brampton; Christian Wiesner, Stouffville, both of Canada

[73] Assignee: ATI Technologies, Inc., Thornhill, Canada

[21] Appl. No.: 09/088,558

[22] Filed: Jun. 2, 1998

[51] Int. Cl.[7] ................................................. G06F 13/00
[52] U.S. Cl. ...................... 710/129; 710/100; 379/88.07
[58] Field of Search .................... 710/126, 100, 710/129, 268, 1, 5, 52, 62, 266; 709/248, 400; 375/222; 370/259, 282, 359, 419, 465, 503, 912; 379/67.1, 88.07, 88.13, 399, 908; 708/522, 523; 455/31.1

[56] References Cited

U.S. PATENT DOCUMENTS

| | | | |
|---|---|---|---|
| 5,481,727 | 1/1996 | Asano et al. ............................ | 711/150 |
| 5,497,373 | 3/1996 | Hulen et al. ............................ | 370/259 |
| 5,753,841 | 5/1998 | Hewitt ..................................... | 84/604 |
| 5,854,908 | 12/1998 | Ogilvie et al. .......................... | 710/128 |
| 5,872,565 | 2/1999 | Greaves et al. ......................... | 345/328 |

*Primary Examiner*—Gopal C. Ray
*Attorney, Agent, or Firm*—Markison & Reckamp, P.C.

[57] ABSTRACT

An audio bus interface system and method interfaces a plurality of digital signal processing devices to an audio bus to facilitate variable processing loading on the DSPs. The audio bus contains frames with synchronization data. The system utilizes a programmable interrupt controller for each digital signal processing unit. The programmable interrupt controller controls the rate at which a given DSP can be interrupted. The respective digital signal processor controls the programmable interrupt controller to maximize its throughput. Also, an audio format translator allows differing audio format protocols to be processed by the same audio DSP.

19 Claims, 4 Drawing Sheets

SYSTEM AND METHOD FOR INTERFACING A DIGITAL SIGNAL PROCESSOR (DSP) TO AN AUDIO BUS CONTAINING FRAMES WITH SYNCHRONIZATION DATA

BACKGROUND OF THE INVENTION

The invention relates generally to systems and methods for interfacing multiple digital signal processing devices with a common bus, and more particularly to systems and methods for interfacing digital signal processing devices to an audio bus.

Multimedia computer systems are being developed which are compliant with Intel® Inc.'s AC 97 link (audio control) bus standard. With the increase in demand for audio applications, the AC link accommodates multiple streams of audio data so that multiple audio devices can be played and audio information may be available for processing. The AC link is a bi-directional, fixed rate serial pulse code modulated (PCM) digital bus. This bus, coming from a host central processing unit, contains multiple input and output audio data streams and communication data streams, such as modem data. The audio stream information may be any suitable number of audio streams such as that from a DVD player, a .WAV audio file, a television tuner, or any other suitable audio source. The AC link architecture, as known in the art, employs a frame based protocol which divides each frame into twelve outgoing and twelve incoming data streams. The data on the link also includes command information and synchronization pulses.

With audio information, there is typically a play and record mode indicating a transmit and receive audio stream. The audio information typically must be processed in real time to allow mixing and playing of audio streams in real time. This may be important when playing movies on the computer, mixing audio from computer games and other purposes. In addition, to facilitate modem communication, the AC link may also interface with one or more modem processors in addition to one or more audio digital signal processors, if desired.

A problem arises where multiple streams of audio must be processed in real time and modem communications are required at the same time. If a separate digital processing device was dedicated to each audio stream, the cost of the system may be prohibitive. Accordingly a single audio digital processor may afford cost savings. Likewise a single digital signal processor to handle the modem communication activities would also reduce costs. With such a system, however, it is important to minimize interrupts to the digital signal processing devices to avoid delays in real time processing and to avoid a reduction in system performance. Hence the maintenance of an acceptable throughput for audio processing and communication information is important. When having multiple digital signal processors on a same bus, with a limited bandwidth, it is desirable to have mechanisms which reduce the number of interrupts to the digital signal processing units. For example, if the baud rate of the modem is selectively increased, additional bandwidth from the link or bus is utilized by the communication digital signal processor thereby reducing the capability of the audio digital signal processor.

In addition, there exists a number of different audio protocols, such as I²S, and other audio protocols that should be accommodated in an audio processing system to allow the system to interface to audio sources from differing suppliers. If different audio protocols are being transmitted over the same AC link, data can be lost without suitable accommodation.

Moreover, an AC link may have baud rates of approximately 12 MHz, whereas digital signal processing devices coupled to the AC link may process the audio information based on a clock speed of a much higher rate, such as 100 MHz. Since the digital signal processors are capable of much faster processing, communication over the link at an improper speed can also result in a loss of data. This can be catastrophic where real time audio processing is required. Conventional systems used to reduce the loss of data in such situations, typically use elastic storage elements such as dual port FIFO devices wherein one port is used for one clock domain and the other port is used for another clock domain. However, this can increase the cost of the system.

Accordingly, a need exists for a suitable audio bus interface system and method that facilitates reduction in DSP interrupts while affording protocol translation and eliminating the need for dual port FIFO configurations.

BRIEF DESCRIPTION OF THE DRAWINGS

FIG. 4b is a diagram illustrating the operation of the bus protocol translator of FIG. 4a.

DETAILED DESCRIPTION OF THE INVENTION

An audio bus interface system and method interfaces a plurality of digital signal processing devices to an audio 13us to facilitate variable processing loading on the DSPs. The audio bus contains frames with synchronization data. The system utilizes a programmable interrupt controller for each digital signal processing unit. The programmable interrupt controller controls the rate at which a given DSP can be interrupted. The respective digital signal processor controls the programmable interrupt controller to maximize its throughput.

In one embodiment, a separate single port FIFO for each audio stream is used so that there is a transmit and receive FIFO for each stream. An audio FIFO controller uses a FIFO status register for each FIFO which provides the available FIFO capacity for the audio DSP. On a continuing basis, the DSPs, generate variable interrupt interval control data to the interrupt controller to space out interrupts during peak processing times. For example when real time audio is being processed, the audio DSP updates an interrupt watermark level to prevent interruption during playing of real time audio. The modem DSP varies its interrupt watermark level to a level which allows an interrupt only after the modem DSP receives the necessary amount of data required to meet its baud rate. The interrupt controller compares the variable interrupt control data, such as the watermark data, to a number of synchronization pulses to programmably vary interrupt levels for the DSP. The interface FIFOs store the differing data streams transferred over the audio bus.

Figure 1:
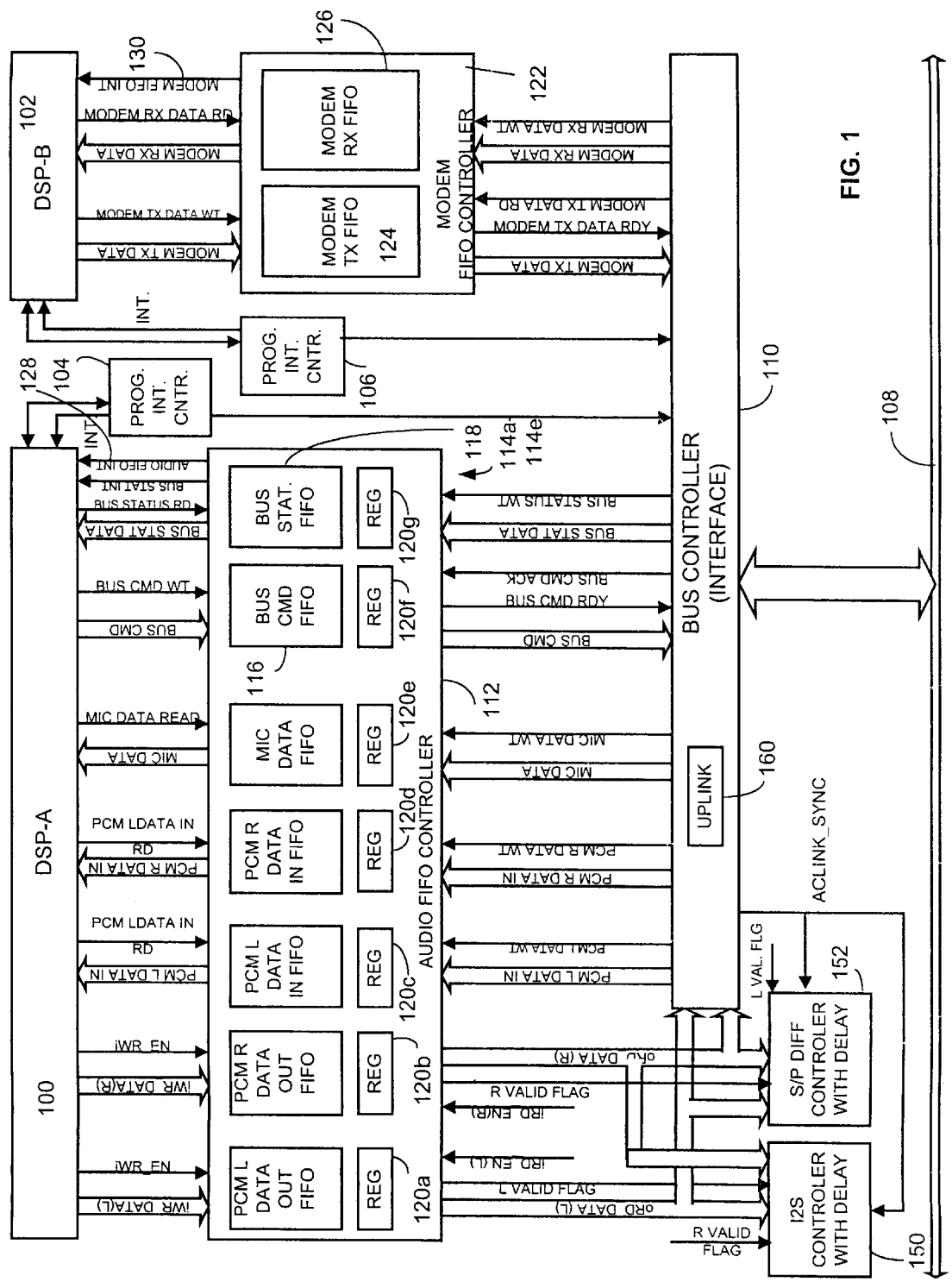
FIG. 1 is a block diagram illustrating an audio bus interface system for interfacing a plurality of digital signal processors to an audio bus containing frames with synchronization data in accordance with one embodiment of the invention.

FIG. 1 shows a first digital signal processor, 100 such as an audio digital signal processor, and a second digital signal processor 102, such as a communication digital signal processor for receiving and transmitting modem data such as AC 97 CODEC information. Each digital signal processor 100 and 102 includes a programmable interrupt controller 104 and 106, respectively, to facilitate variable process loading on each of the DSPs so that unnecessary interrupts are not generated and system performance is enhanced. The audio digital signal processor 100 is coupled to an audio bus 108, such as an AC link, through a bus controller 110 and an audio FIFO controller 112. The bus controller 110 serves as a parallel to serial converter and a serial to parallel converter to translate the serial data from the audio bus 108 to parallel information for use by the audio digital signal processor 100. When the digital signal processor is sending data over the audio bus 108, the bus controller 110 serves as a parallel to serial converter. The bus controller 10 serializes data by packing data in appropriate frame slots. Each FIFO is assigned a frame slot, and the bus controller assigns the FIFO data to the appropriate slots.

In addition, bus controller provides resynchronization of data between the data on the audio bus 108 and the data being communicated with the DSP 100 at a clock speed of 100 MHz. The bus controller 110 includes an upsampler 160 that upsamples the audio bus data (may be at 12 MHz) to a higher data rate to be consistent with the data rate employed by the DSP's. The upsampler may be any suitable Nyquist based upsampling circuit.

The audio bus 108 is preferably an audio bus such as an AC link having synchronization data, for example fixed at 48 KHz, derived from BIT CLOCK data, representing for example 12.288 MHz. The serial data on audio bus 108 is preferably transitioned on each rising edge of a BIT CLOCK pulse.

Figure 2:
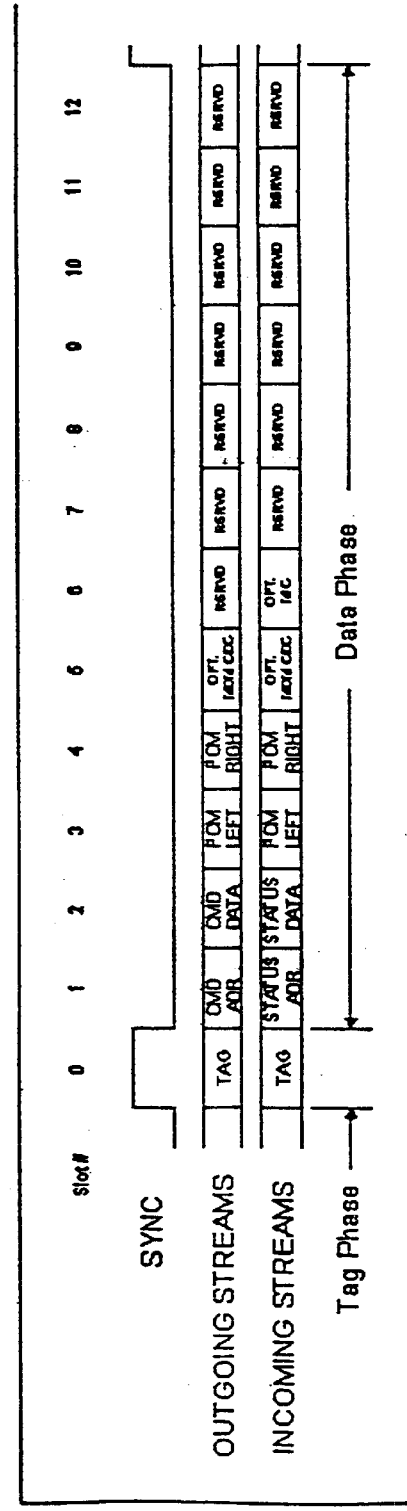
FIG. 2 is a timing diagram illustrating an AC 97 standard bidirectional frame as known in the art.

As shown in FIG. 2, where the audio bus 108 is an AC link, the protocol provides for a 16 bit slot (slot 0), wherein each bit conveys a valid tag for its corresponding time slot within the current audio frame. A "1" in a given bit position of slot 0 indicates that the corresponding time slot within the current audio frame has been assigned to a data stream, and contains valid data. As is known in the art, if a slot is tagged invalid, the source of the data stuffs all bit positions with zeroes during the slot's active time. The synchronization data pulse remains high for a total of 16 BIT CLOCKS at the beginning of each audio frame. The portion of the audio frame, as known in the art, where the synchronization pulse is high is defined as the "tag phase". Although the invention is being described with reference to an AC link type bus, it will be recognized by those of ordinary skill in the art that any suitable audio bus may also be used.

Referring back to FIG. 1, the audio FIFO controller 112 shows an audio bus interface FIFO buffer that stores audio data from the audio bus. There is a dedicated single port FIFO for each audio stream. For example, the audio FIFO controller 112 includes a PCM left data out FIFO 114a, a PCM right data out FIFO 114b, a PCM left data in FIFO 114c, a PCM right data in FIFO 114d and a microphone data FIFO 114e. The audio FIFO controller 112 also includes a bus command FIFO 116 and a bus status FIFO 118. The dedicated FIFOs 114a–114e are preferably eight entries long so up to eight frames can be stored before interrupting the audio DSP 100, however, any suitable length may be used. The audio FIFO controller 112 also includes a set of FIFO status registers 120a–120g serving as audio FIFO status registers showing the available FIFO capacity for each dedicated FIFO for the DSP 100. Data transfer between the I/O FIFO controller 112 and the audio signal processor 100 is preferably at a speed of approximately 100 MHz, although any suitable speed may be used.

The bus controller 110 communicates with the audio FIFO controller 112 through a series of read and write commands as well as data out ready commands as shown. There is a separate data out read command and data in and write command for each multistream of data associated with the dedicated multistream audio FIFOs 114a–114e. However, the microphone data, being only an input to the audio processor does require use of a microphone data out ready command.

The command FIFO 116 stores command data sent from the DSP 100 for an analog modem module (not shown). The status FIFO register 118 stores read return values form the analog modem module in response to the command data.

The programmable interrupt controller 104 in the audio digital signal processor 100 dynamically programs interrupt intervals for the audio DSP to facilitate bandwidth usage enhancement by the audio DSP 100. For example, where an audio stream is being used as real time audio, such as 48 kHz audio data, the DSP sets a suitable interrupt interval such that it will process the audio in real time at the expense of processing other information. The DSP determines whether a stream requires real time processing based on the particular application(s) being run the DSP 100. In this way, the DSP is not constantly interrupted each time additional data is inserted into a FIFO or read from a FIFO in the audio FIFO controller. The audio FIFO controller, using the dedicated transmit and receive interface FIFOs 114a–114e, stores a plurality of differing data streams transferred over the audio bus. These transmit and receive storage devices are dedicated to a corresponding slot in the audio frame (FIG. 2).

The programmable interrupt controller 106 in the modem DSP 102 also serves the same function as the programmable interrupt controller 104 and programs interrupt intervals for the modem DSP 102, based on a baud rate setting of the modem, to facilitate bandwidth usage enhancement for the modem operation. Accordingly, a modem FIFO controller 122 includes a dedicated modem transmit FIFO 124 and a dedicated modem receive FIFO 126. The bus controller 110 communicate with the modem FIFO controller 122 through modem transmit data read commands and modem transmit ready commands, as well as modem receive data writes. Both the audio FIFO controller 112 and the modem controller 122 generate an audio FIFO interrupt 128 and a modem FIFO interrupt 130 respectively, when any of the respective FIFOs are empty or full.

Figure 3:
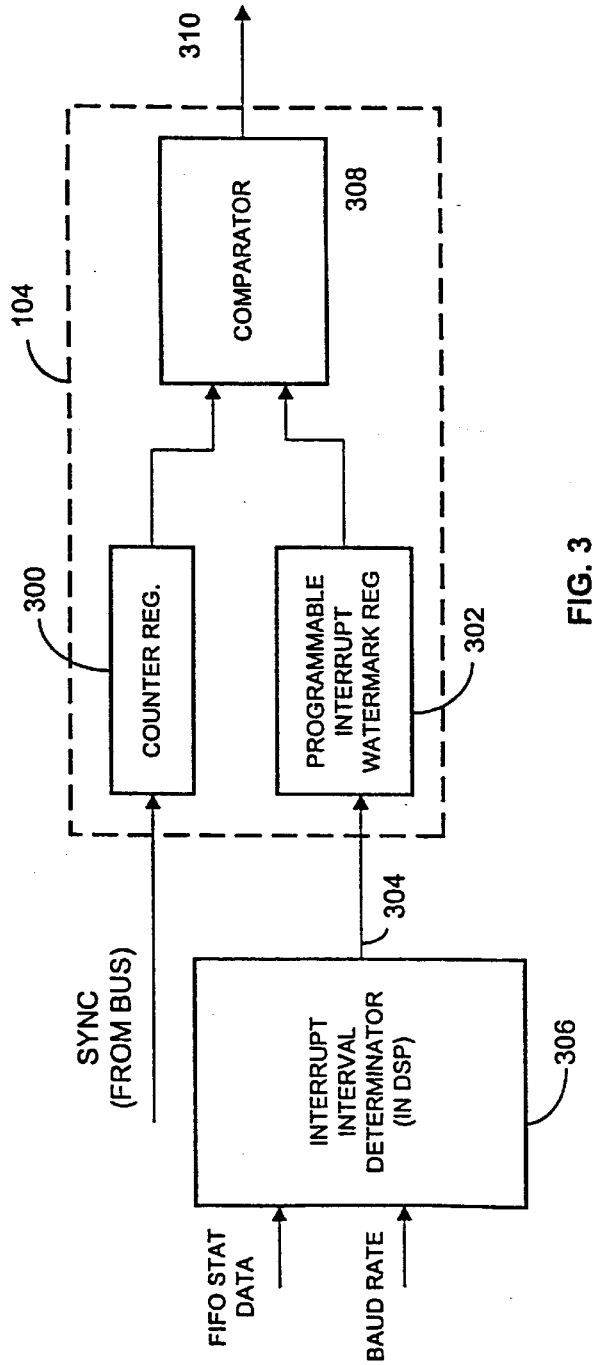
FIG. 3 is a block diagram generally showing a programmable interrupt controller for the audio bus interface in accordance with one embodiment of the invention.

FIG. 3 shows an embodiment of the programmable interrupt controller 104 having a synchronization count register 300 that receives the synchronization data from the audio bus 108 through bus controller 110 (FIG. 1) indicating a count of a number of synchronization pulses. The programmable interrupt controller 104 also includes a programmable interrupt watermark register 302 that receives variable interrupt control data 304, such as data representing a watermark level, from an interrupt interval determinator 306. The interrupt interval determinator 306 may be a software program within the audio digital signal processor 100 which determines, based on FIFO status data and baud rate data, a suitable interrupt interval to allow, for example, real time processing of a particular audio stream. The programmable interrupt controller 104 also includes a comparator 308 that receives the count data from the count register 300 and compares the count data with the data representing the programmable interrupt watermark level from the programmable interrupt watermark register 302. When the count from count register 300 is equal to the programmable interrupt watermark, the comparator 308 generates an interrupt 310 to the DSP 100.

The programmable interrupt controller 106 has the same structure as that shown with respect to programmable interrupt controller 104 except that the interrupt interval determinator is resident on the modem DSP 102 and generates the variable interrupt control data based on the software application running on the DSP. For example, if only one application is running, a lower interrupt level is set. If multiple application are running, such as video playback and video record, a higher interrupt interval may be set.

Figure 4A:
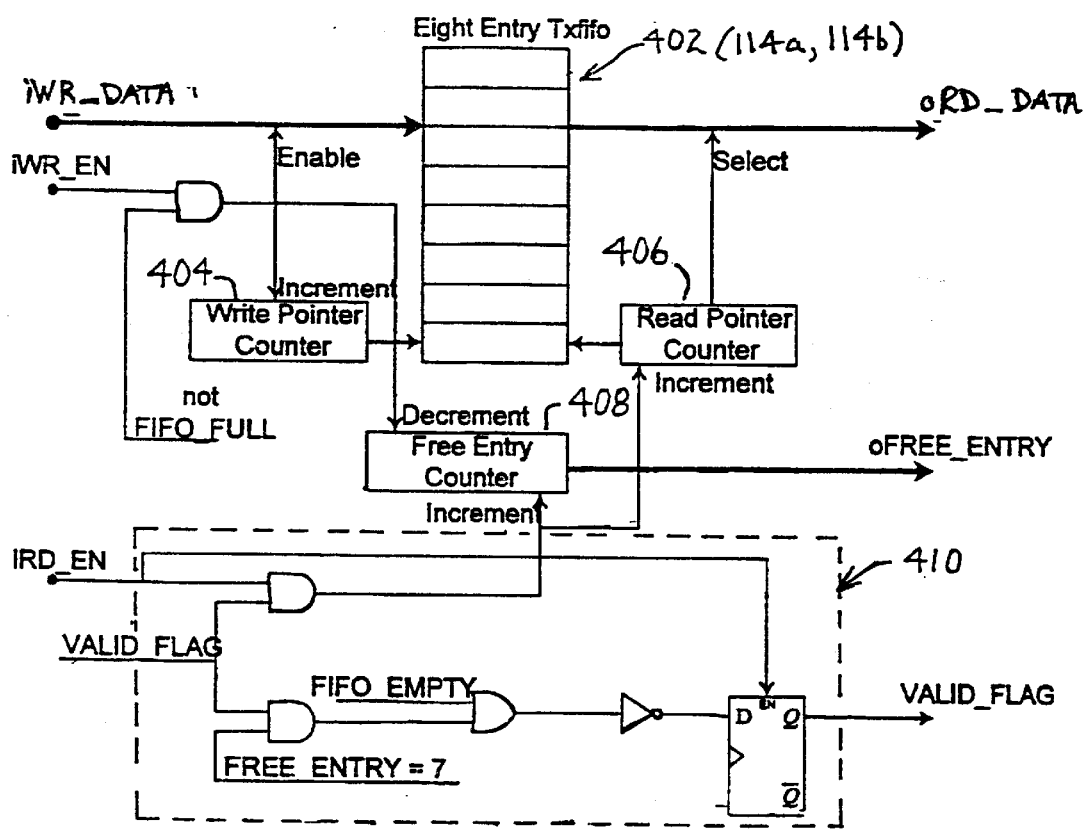
FIG. 4a is a block diagram depicting one example of a bus protocol translator in accordance with one embodiment of the invention.
Figure 4B:
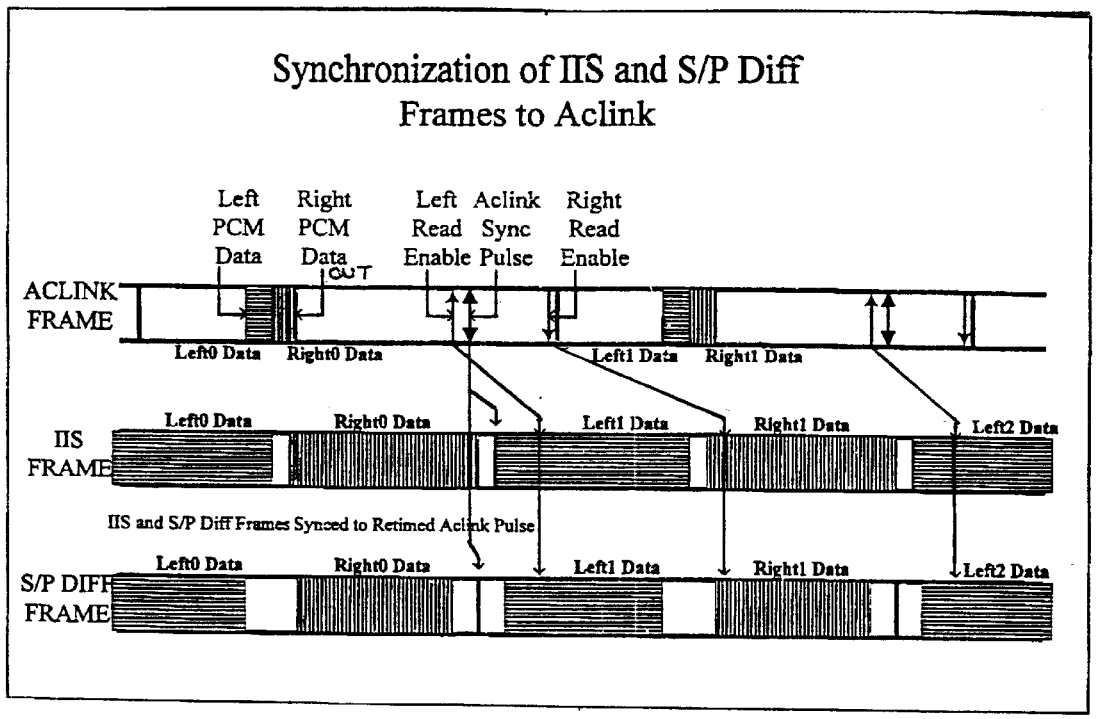

Referring to FIGS. 4a and 4b, FIG. 4a shows an example of a bus protocol format translator 400 (FIFO controller) that facilitates audio protocol format translation between different audio data protocols over the common audio bus 108. The bus protocol format translator 400 is designed to allow pulse code modulated transmission to three ports with different clock rates and formats but the same sampling rate, e.g., 48 kHz. The bus protocol format translator 400 includes transmit FIFO's 402 (i.e., FIFO's 114a and 114b of FIG. 1), control logic including write pointer counter 404, read point counter 406, free entry counter 408 and flag logic 410. The transmit FIFO's 402 operate based on the DSP 100 clock. An input read enable (iRD__EN) signal is the only asynchronous input and is retimed to the DSP clock. The signal ACLINK__SYNC is used to synchronize the bus controller interface 110, the 12S controller 150 and the S/P DIFF controller 152 to the common 48 kHz AC link frame (see FIG. 4b) resulting in three port synchronization. The controllers read diretly from the transmit FIFOs 402 to avoid independent buffering by each controller (port).

The translator 400 only updates the read enable signals at a time when a resulting PCM DATA OUT word is not currently being transmitted. In this way, the data does not have to be retimed individually to three different port clocks. The VALID__FLAG signal is used to qualify the current dala for a controller, to be useful (a one) or if zero meaning the data should not be transmitted as may happen in an underflow condition. The read enable signal, which is generated by the bus controller 110 occurs during one clock period every 48 kHz, and causes the read pointer counter to increment to a new entry in the FIFO 402 so that the PCM data out changes. The data will remain as the output data until another read enable occurs. Hence the data is read by each controller directly from the FIFO to avoid having to buffer the data in each controller at each controller's own clock speed. The left read enable and right read enable is spaced about the ACLINK__SYNC pulse so that the controllers can obtain data at suitable times directly from the FIFO.

Synchronization is preferably performed on one frame only to prevent jitter due to the asynchronous nature of the translator. The read pointer counter is updated for the left channel PCM ACLINK controller data when transmitting right channel 12S or S/P Diff PCM data and vice versa for transmitting left channel PCM as shown in FIG. 4b. All three controllers are synchronized to the same ACLINK__SYNC pulse and hence the same frame period, but each controller obtains data from the FIFO at different times within a frame as shown in FIG. 4b.

In operation, to activate the audio processing system, a host application sends a read or write request to the audio DSP 100. This may be done for example by writing a message to a host data register (not shown) of the audio DSP 100. The audio DSP 100 then decodes the message and writes a suitable command to the corresponding bus command FIFO 116. If there is a pending command in the command FIFO 116, the command is sent out on the audio bus 108.

For a read command, the bus controller 110 waits for the requested data to be returned on the next immediately following frame. This read data is then stored in the bus status FIFO 118 and an audio FIFO interrupt 128 is generated to interrupt the audio DSP 100. Next the programmable interrupt controller 104 reads the bus status FIFO 118 and generates a message back to the host application. This message for example may be created by the audio DSP 100 by writing to the host data register, which automatically generates an interrupt to the host.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. An audio bus interface for interfacing a first digital signal processor (DSP) to an audio bus containing frames with synchronization data therein comprising:

means for generating first variable interrupt interval control data; and means, responsive to the synchronization data, for programmably varying interrupt intervals for the digital signal processor in response to the first variable interrupt interval control data to facilitate variable processing loading on the DSP.

2. The audio bus interface of claim 1 wherein the means for programmably varying interrupt intervals includes means, responsive to the synchronization data, for counting a number of synchronization pulses and means, responsive to the first variable interrupt interval control data, for setting an interrupt interval threshold and means for comparing the counted number of synchronization pulses to the first variable interrupt interval control data to determine a variable interrupt interval.

3. The audio bus interface of claim 1 further including bus protocol format translation means for facilitating audio protocol format translation between differing audio data protocols over the same audio bus.

4. The audio bus interface of claim 1 including:

audio bus interface FIFO buffer means for storing audio data from the audio bus, coupled between the DSP and the audio bus; and means, readable by the DSP, for storing status data representing a status of the audio bus interface FIFO buffer means to facilitate transfer of information to and from the audio bus interface FIFO buffer means.

5. The audio bus interface of claim 4 wherein the audio bus interface FIFO buffer means includes single port FIFO storage elements to facilitate resynchronization of a DSP clock domain with a clock domain of the audio bus.

6. The audio bus interface of claim 4 wherein the audio bus transfers audio for a plurality of audio streams and the audio bus interface FIFO buffer means includes a transmit and receive storage element for each of the plurality of audio streams that is readable by the DSP.

7. The audio bus interface of claim 1 wherein the audio bus transfers data to a second DSP and the means for generating variable interrupt interval control data generates second variable interrupt interval control data for the second DSP and the means for programmably varying interrupt intervals varies an interrupt interval for the second DSP in response to the second variable interrupt interval control data.

8. The audio bus interface of claim 7 wherein the means for programmably varying interrupt intervals is also operably coupled to the second DSP and further includes means, responsive to the synchronization data, for counting a number of synchronization pulses for the second DSP and means, responsive to the second variable interrupt interval control data for setting an interrupt interval threshold for the second DSP and means for comparing the counted number of synchronization pulses to the second variable interrupt interval control data to determine an interrupt interval for the second DSP.

9. An audio bus interface for interfacing a first and a second digital signal processor (DSP) to an audio bus containing frames with synchronization data therein comprising:

means for dynamically programming interrupt intervals for the first and second DSP to facilitate first and second DSP bandwidth usage enhancement which includes:
means for generating first variable interrupt interval control data; and
means, responsive to the synchronization data, for programmably varying interrupt intervals for the first digital signal processor in response to the first variable interrupt interval control data to facilitate variable processing loading on the first DSP; and interface FIFO means, operatively coupled between the first DSP and the audio bus, for storing a plurality of differing data streams transferred over the audio bus wherein the interface FIFO means includes a dedicated transmit and receive storage element for each of a plurality of audio streams sent on the audio bus.

10. The audio bus interface of claim 9 wherein the first DSP processes real time pulse code modulated audio data and the second DSP processes modem data.

11. The audio bus interface of claim 9 including means, readable by the first DSP, for storing status data representing a status of each of the dedicated transmit and receive storage elements to facilitate transfer of information to and from the interface FIFO means.

12. A method for interfacing a digital signal processor (DSP) to an audio bus containing frames with synchronization data therein comprising:

generating first variable interrupt interval control data; and programmably varying interrupt intervals for the digital signal processor in response to the first variable interrupt interval control data to facilitate variable processing loading on the DSP.

13. The method for interfacing of claim 12 wherein the step of programmably varying interrupt intervals include counting a number of synchronization pulses, setting an interrupt interval threshold and comparing the counted number of synchronization pulses to the variable interrupt interval control data to determine an interrupt interval.

14. The method for interfacing of claim 12 further including the step of providing bus protocol format translation for facilitating bus protocol format translation between differing protocols over the same audio bus.

15. The method for interfacing of claim 12 including:
storing audio data from the audio bus in an audio bus interface FIFO buffer that is coupled between the DSP and the audio bus; and
storing status data representing a status of the audio bus interface FIFO to facilitate transfer of information to and from the audio bus interface FIFO buffer.

16. The method for interfacing of claim 15 wherein the audio bus interface FIFO buffer is a single port FIFO storage element to facilitate resynchronization of a DSP clock domain with a clock domain of the audio bus.

17. The method for interfacing of claim 15 wherein the audio bus transfers audio for a plurality of audio streams and the audio bus interface FIFO buffer means includes a transmit and receive storage element for each of the plurality of audio streams that is readable by the DSP.

18. The method for interfacing of claim 12 wherein the audio bus transfers data to another DSP and wherein generating variable interrupt interval control data includes generating second variable interrupt interval control data for the other DSP and the step of programmably varying interrupt intervals includes varying an interrupt interval for the other DSP in response to the second variable interrupt interval control data.

19. The method for interfacing of claim 18 wherein the step of programmably varying interrupt intervals includes counting a number of synchronization pulses for another DSP and setting an interrupt interval threshold for the other DSP in response to second variable interrupt interval control data and comparing the counted number of synchronization pulses to the second variable interrupt interval control data to determine an interrupt interval for the other DSP.

* * * * *